Sept. 9, 1924.  R. J. RITCHIE  1,507,719
DEHYDRATOR
Filed July 25, 1923   2 Sheets-Sheet 2

INVENTOR
Rush J. Ritchie.
BY
ATTORNEY

Patented Sept. 9, 1924.

1,507,719

UNITED STATES PATENT OFFICE.

RUSH J. RITCHIE, OF KANSAS CITY, MISSOURI, ASSIGNOR OF ONE-HALF TO FRANK SPIEKERMAN, OF GREENWICH, CONNECTICUT.

DEHYDRATOR.

Application filed July 25, 1923. Serial No. 653,649.

*To all whom it may concern:*

Be it known that I, RUSH J. RITCHIE, a citizen of the United States, residing at Kansas City, in the county of Jackson and State of Missouri, have invented certain new and useful Improvements in Dehydrators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to dehydrators and the primary object of the invention is to provide a highly efficient dehydrator especially adapted for vegetables, fruits and berries.

The principal object of the invention is to provide an evaporator in which the vegetable matter, such as vegetables, fruits and berries, can be blanched to cause it to give up its moisture and then be subjected to an evaporating heat to dry it. By first blanching the vegetable matter to open the pores thereof and allow the escape of moisture, and then closing the pores by the application of heat, the treatment will provide a highly efficient product in that it will not spoil as readily as vegetable matter which has been treated with heat alone in such a manner that only the pores close so as to confine the moisture within the pulp.

The novel construction of my invention will be clearly understood by reference to the following description in connection with the accompanying drawings, in which Fig. 1 is a vertical, longitudinal, sectional view through a dehydrator constructed in accordance with my invention.

Figure 1:
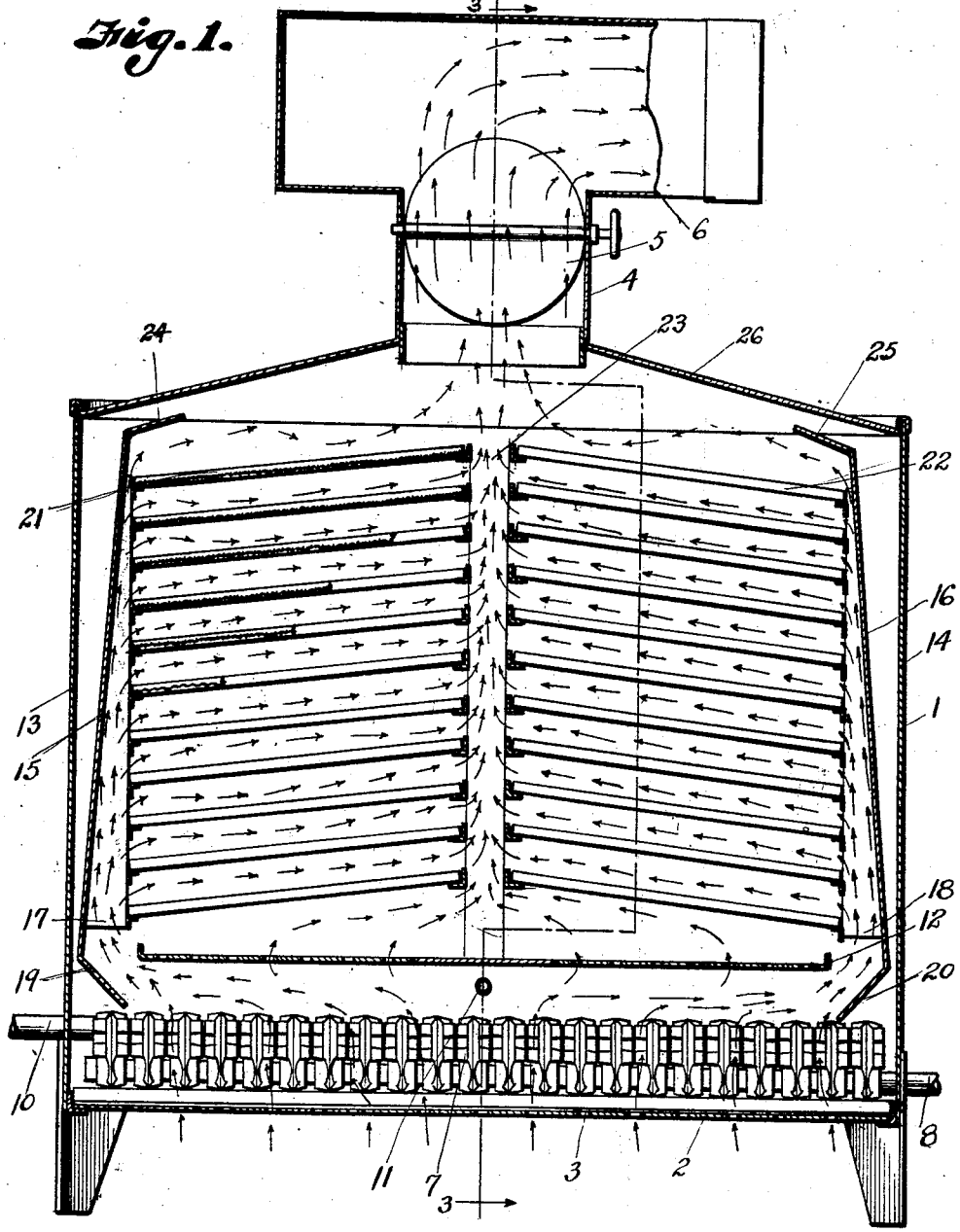
Figure 2:
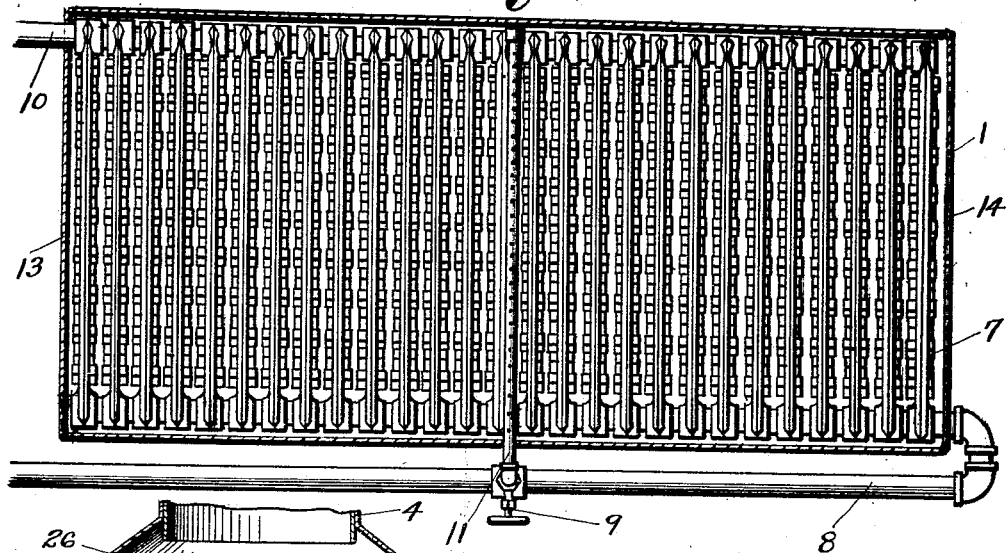
Fig. 2 is a plan view of the steam heated radiator for supplying the heat.
Figure 3:
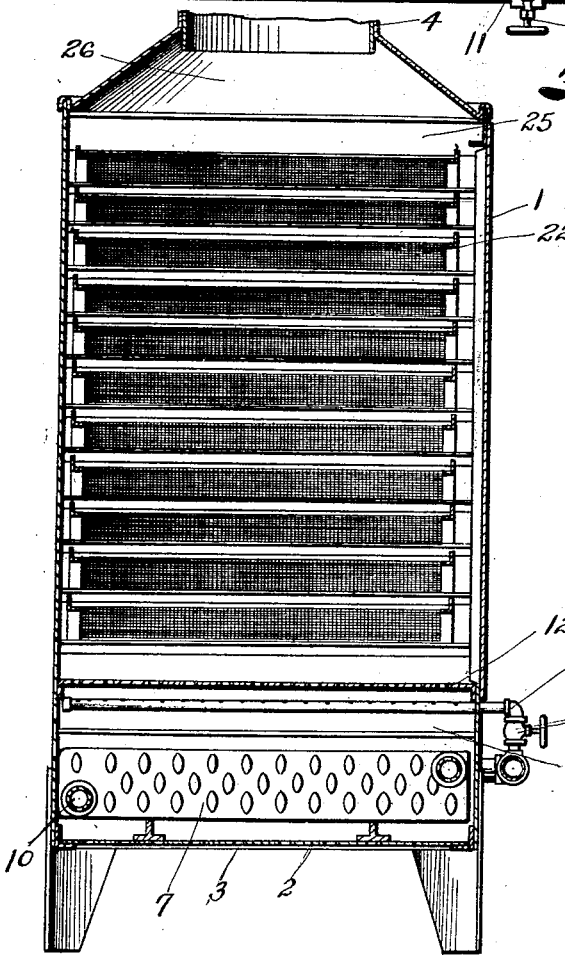
Fig. 3 is a cross sectional view through the body portion of the dehydrator.

The dehydrator is shown as comprising a casing 1 which may have suitable inlet doors appropriately supported. The bottom 2 of the casing is provided with a plurality of small air openings 3, through which air may pass to be directed through the various shelves and ducts on the interior of the casing 1 and escape through the top outlet 4 controlled by a damper 5. The outlet 4 carries a pipe or casing 6 in which an exhauster fan may be provided if desired to induce the flow through the casing 1.

Above the bottom 2 is a heat radiator 7, supplied by fluid, for example, steam, through the pipe 8, the pipe 8 being controlled by a valve 9. The pipe 8 enters one end of the radiator and the radiator exhausts at the other end through a pipe 10.

The pipe 8 carries a transverse pipe 11. The pipe 11 is located above the radiator 7 and below the perforate baffle 12. The perforate baffle is spaced from the sides 13 and 14 of the casing. Between the ends of the baffle 12 and the walls 13 and 14 are vertically inclined baffles 15 and 16 which incline inwardly toward the top and at their edges they are provided with walls 17 and 18 to form flues of progressively decreasing effective cross sections. The flues 15 and 16 have depending, inwardly disposed, lower ends 19 and 20 to direct the heat from the radiator into the flue proper and between the flues 15 and 16 I have shown two rows of shelves 21 and 22. The shelves are inclined from the respective ends toward the center in an upward direction and their outer edges communicate with the flues. The inner edges are supported in spaced relation to provide a central flue 23 through which the heated gases may pass. The gases may pass through the opening 4, the flow being controlled by the damper 5.

The shelves are formed of frames having a screen or reticulated materal. There is an important reason for inclining the screens inwardly and upwardly. If they were in a horizontal position the heat would pass directly through the sets of screens 21 and 22 from the top to the bottom but by inclining them upwardly and inwardly, the heated gases will pass through the flues formed by the baffles 15 and 16 and flow between the shelves and over and under the material to be treated so that the gases will enter the vertical flue or passageway 23 and all of the vegetable matter will have uniform treatment. This is due to the fact that the flues formed by the baffles 15 and 16 are of progressively decreasing area from the bottom toward the top.

The heat unit therefore being properly proportioned and in order to maintain the top of the dehydrator at the same temperature as the bottom I provide the tops of the flues 15 and 16 with inwardly disposed ends or flanges 24 and 25 in spaced relation with the top 26, and since the baffles 15 and 16 are spaced away from the sides of the casing, it will be apparent that some of the hot gases will pass between the baffles and the walls 13 and 14 and flow along the under side of the top to the opening 4. In this manner the zone surrounding the shelves will be maintained at a uniform temperature.

Certain kinds of material should be blanched; that is, it should be steamed to cause the pores to open so that when heat is applied, the moisture can be caused to pass off from the material to be treated. In order to provide for the blanching of the material I admit steam to the pipe 11 which causes considerable humidity in the casing 1, enough to open the pores of the material to be treated. Then the steam is cut off and the heat allowed to evaporate or dehydrate from the material under treatment.

It will be apparent that a device constructed in accordance with my invention is simple, rugged and effective and that the moisture can be preliminarily driven off before the actual drying takes place. It is a characteristic of vegetable matter that when under treatment, if the pores are opened by the application of steam and then closed by hot air, they cannot be subsequently opened to take in moisture under ordinary conditions. Of course, they will take up moisture when water is applied but they will not take up moisture from the air. Therefore, the vegetable matter will be preserved for a long time.

Figure 4:
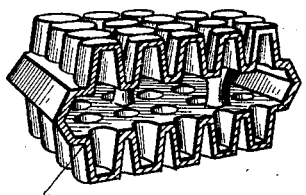
Fig. 4 is an enlarged, perspective, sectional view of a fragment of the radiator.

The heat radiator per se is not new. It has been used in other connections but I find it highly adaptable for use in connection with a device constructed in accordance with my invention since a construction such as shown in Fig. 4 provides a relatively large heat radiating surface. I do not claim the particular construction of this device as a heat radiator but only in connection with my invention.

What I claim and desire to secure by Letters Patent is:

1. A dehydrator, comprising a casing, a steam radiator in the bottom of the casing, a steam pipe exterior of the radiator and connected thereto, a steam pipe connected to the first named pipe and extending into the casing, a horizontal partition above the steam radiator and above the pipe within the casing, vertical partition walls spaced from opposite sides of the casing inwardly and upwardly, and rows of shelves within the casing, the rows being spaced centrally of the casing to provide a space in line with the opening in the top of the casing.

2. A dehydrator, comprising a casing, a steam radiator in the bottom of the casing, a steam pipe exterior of the radiator and connected thereto, a steam pipe connected to the first named pipe and extending into the casing, a horizontal partition above the steam radiator and above the pipe within the casing, vertical partition walls spaced from opposite sides of the casing inwardly and upwardly, and rows of shelves within the casing, the rows being spaced centrally of the casing to provide a space in line with the opening in the top of the casing, the vertical partition walls having inwardly inclined ends.

3. A dehydrator, comprising a casing, a steam radiator in the bottom of the casing, a steam pipe exterior of the radiator and connected thereto, a steam pipe connected to the first named pipe and extending into the casing, a horizontal partition above the steam radiator and above the pipe within the casing, vertical partition walls spaced from opposite sides of the casing inwardly and upwardly, and rows of shelves within the casing, the rows being spaced centrally of the casing to provide a space in line with the opening in the top of the casing, the vertical partition walls having inwardly inclined ends, the upwardly inclined ends being disposed toward the center of the casing to direct products of combustion along the top of the casing toward the center outlet opening.

4. A dehydrator, comprising a casing, having inlets at the bottom and an outlet at the top, a steam radiator in the bottom of the casing, an inlet pipe communicating with the steam radiator, a separate valve controlled pipe connected to the inlet pipe and extending transversely into the casing above the steam radiator, a horizontal partition above the transverse pipe, having ends terminating short of the side walls of the casing, vertical partitions in the casing, spaced from the side walls of the casing and extending upwardly and inwardly, the vertical partitions having inwardly depending flanges at their bottoms and upwardly inclining flanges at their top, side flanges on the vertical partitions, shelves between the vertical partitions inclining upwardly toward the center, the shelves being arranged in two rows, the rows being spaced apart to form a center passage way, and spaces between the shelves communicating with the spaces between the vertical partitions and the ends of the shelves.

5. A dehydrator, comprising a casing, having inlets at the bottom and an outlet at the top, a steam radiator in the bottom of the casing, an inlet pipe communicating with the steam radiator, a separate valve controlled pipe connected to the inlet pipe and extending transversely into the casing above the steam radiator, a horizontal partition above the transverse pipe, having ends terminating short of the side walls of the casing, vertical partitions in the casing, spaced from the side walls of the casing and extending upwardly and inwardly, the vertical partitions having inwardly depending flanges at their bottoms and upwardly inclining flanges at their top, side flanges on the vertical partitions, shelves between the vertical partitions inclining upwardly toward the center the shelves being arranged in two rows, the rows being spaced apart to form a center passage way, spaces between the vertical partitions and the ends of the shelves, and a damper for valving the outlet of the casing.

In testimony whereof I affix my signature.

RUSH J. RITCHIE.